United States Patent
Kamin

[11] Patent Number: 5,350,435
[45] Date of Patent: Sep. 27, 1994

[54] SOIL FERTILIZATION METHOD

[75] Inventor: Gene L. Kamin, Evergreen, Colo.

[73] Assignee: Planet Protection Systems, Inc., Boulder, Colo.

[21] Appl. No.: 26,560

[22] Filed: Mar. 4, 1993

[51] Int. Cl.$^5$ .................. C05B 7/00; C05F 15/00
[52] U.S. Cl. ................................. 71/25; 71/34;
71/23; 71/903; 71/904; 354/300; 55/528;
423/239.1
[58] Field of Search .............. 162/13; 71/24, 23, 25,
71/26, 43, 903, 904; 55/524, 528, DIG. 5;
423/237-239

[56] References Cited

U.S. PATENT DOCUMENTS

| | | | |
|---|---|---|---|
| 4,059,409 | 11/1977 | Barto et al. | 422/169 |
| 4,167,319 | 9/1979 | Feitzinger et al. | 354/300 |
| 4,292,285 | 9/1981 | Nakao et al. | 423/210 |
| 4,303,329 | 12/1981 | Michlin | 354/300 |
| 4,333,752 | 6/1982 | Thies et al. | 96/135 |
| 4,334,756 | 6/1982 | Michlin et al. | 354/300 |
| 4,371,247 | 2/1983 | Hewelt et al. | 354/300 |
| 4,377,331 | 3/1983 | Seelenbinder et al. | 354/300 |
| 4,397,663 | 8/1983 | Michlin et al. | 96/152 |
| 4,411,803 | 4/1984 | Pelis | 354/299 |
| 4,449,815 | 5/1984 | Staffan | 355/106 |
| 4,455,195 | 6/1984 | Kinsley | 162/13 |
| 4,473,282 | 9/1984 | Michlin | 354/300 |
| 4,582,423 | 4/1986 | Putnam et al. | 355/106 |
| 4,680,040 | 7/1987 | Gooray et al. | 96/152 |
| 4,695,146 | 9/1987 | Fuller | 354/309 |

*Primary Examiner*—Ferris Lander
*Attorney, Agent, or Firm*—Fields, Lewis, Pittenger, Rost & Smith

[57] ABSTRACT

The present invention provides a soil fertilization method which includes a process for producing a fertilyzer by-product from an ammonia filtering media. The method includes the steps of providing a filter media containing phosphoric acid soaked particles. In addition, the method includes providing ammonia laden air. The ammonia laden air is passed through the filter media to remove ammonia from the air which is removed by a chemical reaction which converts the phosphoric acid soaked wood particles to ammonium phosphate coated wood particles. After substantially all of the wood particles are converted to ammonium phosphate wood particles, the filter media is collected and then applied to soil to fertilize and build the soil.

10 Claims, 2 Drawing Sheets

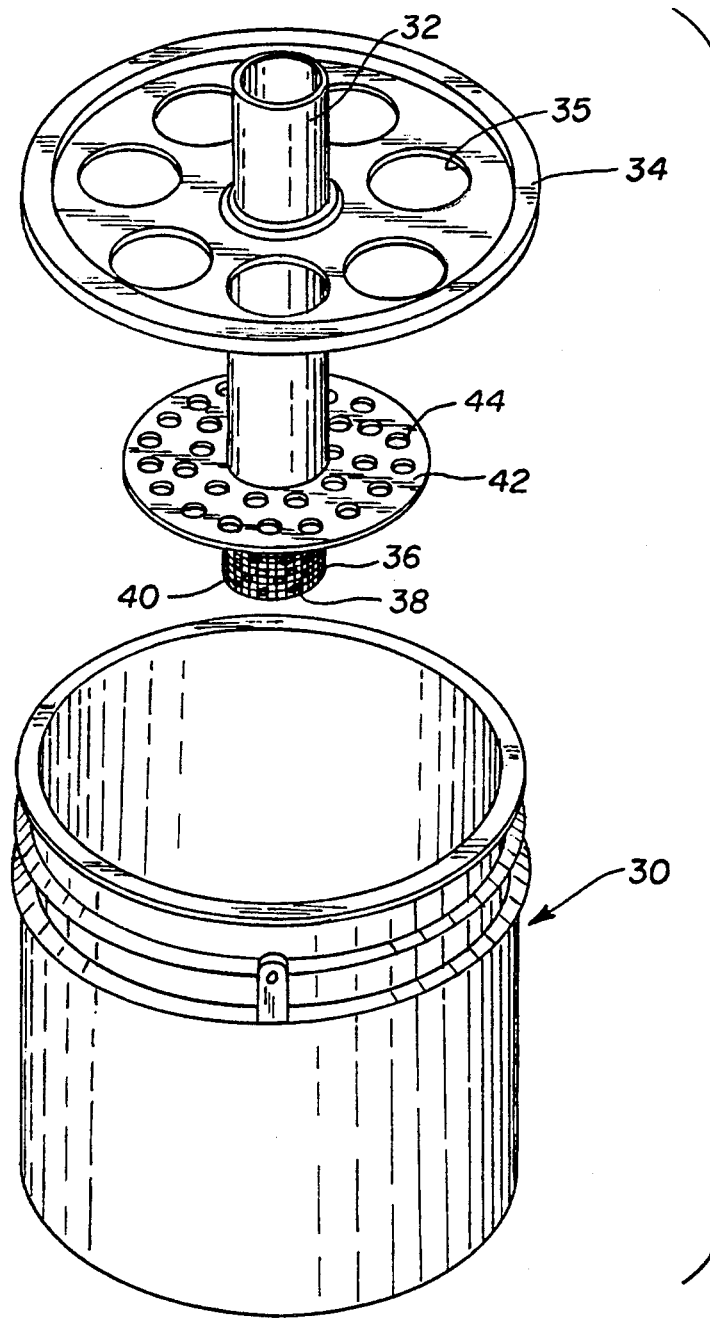

SOIL FERTILIZATION METHOD

TECHNICAL FIELD OF THE INVENTION

The invention relates generally to methods for scrubbing or absorbing ammonia vapors produced by diazo blueprint copying machines, and, more specifically, to an environmentally safe scrubbing method producing a by-product which can be used as a fertilizer.

BACKGROUND OF THE INVENTION

Concern over the safe use and disposal of reprographic chemicals used and generated in diazo-based reproduction facilities has increased greatly over the past decade. It is contemplated that strict environmental regulations for worker protection and disposal of reprographic chemicals and by-products will be promulgated in the very near future. As a result, creative methods and approaches for dealing with this problem are needed. Indeed, unless ways are developed to make these reproduction formats less environmentally damaging, it is probable that their use will be prohibited in the near future or greatly curtailed at a minimum.

Current chemical use in the diazo industry is based on a once-through approach for ammonia supply and emissions filtering. The ammonia, supplied as a gas (anhydrous) or liquid (aqueous), is utilized in the process to develop the print. Subsequently, a phosphoric acid filter is used to scrub the machine emissions to reduce ammonia vapors in the workplace environment. Unfortunately, the phosphoric acid filter media loses its effectiveness after it has been in use awhile and must be disposed of. The spent filter media contains a high concentration of ammonia, specifically ammonium phosphate, which is generally considered to be hazardous, even though ammonia is a natural constituent of the environment and often touted as being nondamaging environmentally. The problem is that in high concentrations, ammonia containing materials can adversely affect ground water and surface water systems.

Accordingly, it would be desirable if an environmentally safe way of disposing of the spent ammonia containing filter media were available. In the alternative, it would be desirable if the spent filter by-product could be recycled or used in some way so that it would not have to be disposed of in landfills, waste water treatment plants, or in other conventional treatment facilities.

DISCLOSURE OF THE INVENTION

The present invention addresses the aforementioned needs by providing a soil fertilization method which includes a process for producing an environmentally safe by-product from an ammonia filtering media. The by-product is used as a fertilyzer and soil builder.

The method includes the steps of providing a filter media containing phosphoric acid soaked particles. In addition, the method includes the step of providing ammonia-laden air which as contemplated herein would be generated by a source such as a Diazo type copier.

In accordance with the method, the ammonia-laden air is passed through the filter media to remove ammonia from the air and to convert the phosphoric acid soaked wood particles of the filter media to ammonium phosphate coated wood particles.

After converting substantially all of the phosphoric acid in the wood particles to ammonium phosphate, the filter media now referred to as spent filter media is collected. The spent filter media is then applied to soil to fertilize and build the soil in accordance with the method of the present invention.

In a preferred embodiment of the present invention, a container is provided for the filter media. The container has an inlet for receiving ammonia laden air and an outlet for discharging ammonia-less air. The container also has access means for enabling one to quickly gain access to the container's interior so that spent filter media can be easily removed from the container, thereby enabling the container to be refilled with fresh filter media.

In a preferred embodiment, the container access means includes a lid which is removably attached to one end of the container. A preferred embodiment of the present invention also includes sheets of glass fibrous material for covering the container's inlet and outlet. The glass fibrous sheets spread out the incoming ammonia-laden air across a lateral surface of the filter media to enhance the ammonia removal process provided by the filter media.

BRIEF DESCRIPTION OF THE DRAWINGS

The invention will be more readily understood by reference to the accompanying drawings wherein like reference numerals indicate like elements throughout the drawing figures, and in which:

FIG. 3 is an exploded perspective view of another container of the present invention for carrying out the method of the present invention.

BEST MODE FOR CARRYING OUT THE INVENTION

As previously mentioned, the soil fertilization method provided by the present invention includes a process for producing an environmentally safe by-product from an ammonia filtering media which, in accordance with the method of the present invention, is used as a soil fertilizer and builder.

The environmentally safe fertilyzer by-product produced by passing ammonia-laden air (which, as previously mentioned, is normally generated by a diazo copier) through an ammonia filtering media. In a preferred embodiment of the present invent, ion, the filtering media contains only phosphoric acid soaked wood particles which are preferably produced by soaking wood particles of a preferred size in phosphoric acid and then removing the excess phosphoric acid from the wood particles by centrifuging. The phosphoric acid soaked wood particles, i.e., referred to herein as fresh filter media, filters, i.e. removes or scrubs the ammonia from the air as a result of a chemical reaction between the ammonia and the phosphoric acid which converts the phosphoric acid to ammonium phosphate. The reaction occurs when the ammonia contacts the wood particles.

When substantially all of the phosphoric acid soaked wood particles have been converted to ammonium phosphate particles, the ammonium phosphate particles (now referred to as spent filter media) are collected. The spent filter media is then applied to soil for purposes of fertilizing the soil and building the soil. The wood particles act as a soil builder while the ammonium phosphate serves as a fertilizer.

To enhance conversion of the filter media to ammoniom phosphate wood particles, the filter media is held within a container which is specially designed to enhance contact of the ammonia-laden air with the wood particles.

Figure 1:
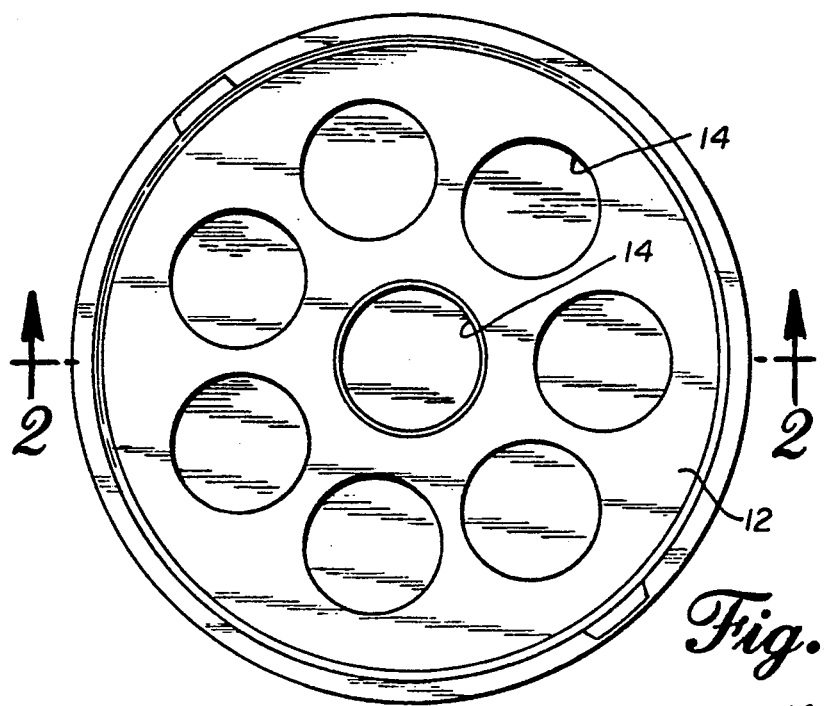
FIG. 1 is a top plan view of a container of the present invention for carrying out the method of the present invention.
Figure 2:
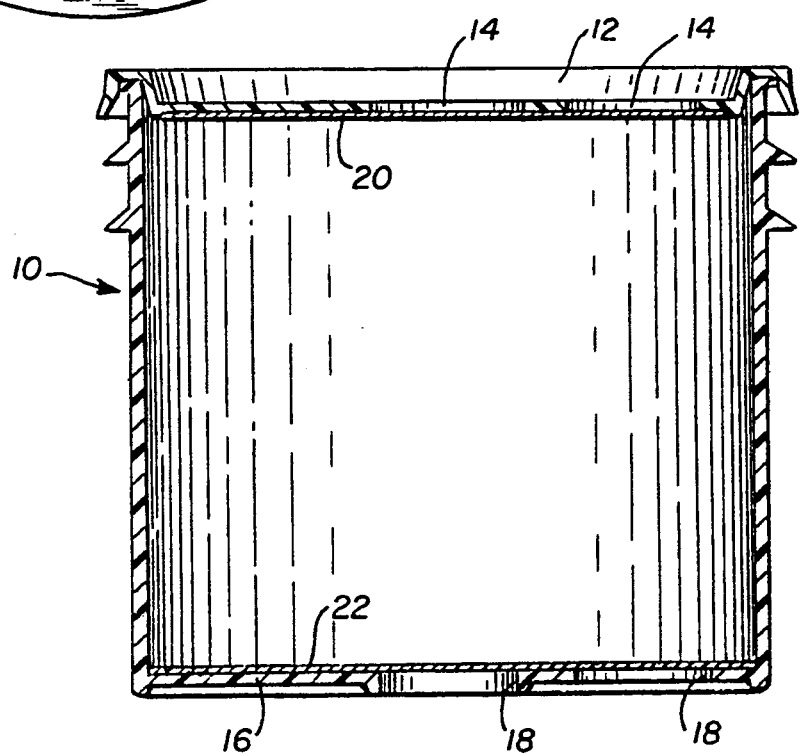
FIG. 2 is a cross-sectional view taken along lines 2—2 of FIG. 1.

FIGS. 1 and 2 illustrate such a container 10 which is cylindrically shaped and preferably made from plastic. Container 10 has a removable lid 12 located at one end of the container which is provided with a plurality (actually eight) of apertures 14. While not shown, the container's bottom 16 is also provided with eight apertures 18.

In accordance with the method of the present invention, apertures 18 of bottom 16 receive ammonia-laden air while apertures 14 of lid 12 pass ammonia-less air, i.e. air which has been scrubbed by the filter media in container 10 to remove the ammonia therefrom. The filter media is not shown in container 10. However, it is held within or retained within the container and prevented from falling out through apertures 14 and 18 by a pair of fibrous glass disks 20, 22 which are respectively located against the inner surfaces (not numbered) of lid 12 and bottom 18. The fibrous glass disks, in addition to retaining the filter media within container 10, serve to spread out the incoming ammonia-laden air across a lateral surface of the filter media so that the ammonia contacts all of the wood particles thereby converting all particles to ammonium phosphate coated wood particles.

As previously mentioned, after converting all or substantially all of the wood particles to ammonium phosphate coated wood particles, the now spent filter media is removed from the container (i.e., collected) and applied to soil in accordance with the method of the present invention where it serves as a soil fertilizer and soil builder. The spent filter media is easily removed from container 10 by simply removing lid 12 from the container and then dumping the spent filter media from container 10 into a suitable collection device (not shown).

Lid 12 is preferably made from the same material container 30 is, i.e. a slightly resilient plastic material such as polycarbonate, so that it is easily removed from the container by slightly bending the lid. It will be appreciated that a lid of this type is conventional and is designed to snap over the end of the container so that it is tightly secured to the container.

After removing and collecting the spent filter media, container 10 may be recharged with fresh filter media, i.e., filter media containing phosphoric acid soaked wood particles. Lid 12 is then snapped back on container 10, thereby readying the container for use as an ammonia scrubbing filter again.

FIG. 3 illustrates another container 30 of the present invention which is similar to container 10 with the exception that instead of providing the container's bottom with inlet apertures 18 for receiving ammonia-laden air, container 30 is provided with a central inlet conduit 32 which projects through the lid 34 of the container and extends to the bottom of the container where it terminates at its end 36 adjacent the container's bottom. As illustrated, end 36 is provided with a plurality of apertures 38 through which the incoming ammonia-laden air must pass before it enters the container for purposes of contacting and converting the fresh filter media to spent filter media, as described above. As illustrated, the terminal end 36 of conduit 32 is covered with a screen 40 to prevent filter media from entering conduit 32.

FIG. 3 also illustrates that conduit 32 has an apertured flange 42 mounted about its lower mid-section area above its terminal end 36. The apertures 44 of apertured flange 42 serve to spread out or diffuse the ammonia-laden air entering the container so that all of the filter media in container 30 is contacted by the ammonia-laden air and converted to ammonium phosphate wood particles.

As will be appreciated, the upwardly traveling ammonia-laden air will be substantially ammonia-free by the time it reaches lid 34 and exits through apertures 35 of lid 34. While not shown, the underside surface of lid 34 is also covered with a glass fibrous material similar to that shown in FIG. 2 for preventing the filter material from falling out through exit apertures 35.

Container 30 and lid 34 are also preferably made out of a slightly resilient plastic material such as polycarbonate which enables lid 34 to snap onto the end of container 30 and be easily removed by slightly bending the lid. As such, those skilled in the art will appreciate that spent filter media can be quickly recharged with fresh filter media.

Wood chips providing suitable results in accordance with the present invention have a particle size ranging between 1/16th and 3/16ths of an inch. As such, the wood chips will pass through screen having a mesh size of about ¼ inch. A particularly preferred wood particle composition of the present invention has 50 wt % ⅛th inch wood chips; 20 wt % 1/16th inch wood chips; and 30 wt % 3/16ths inch chips.

Wood chips of the present invention are also preferably soaked in a solution containing three parts phosphoric acid to one part water for several minutes and then centrifuged (or tumbled) to remove the excess acid.

The invention has been described in detail with reference to particular embodiments thereof, but it will be understood that various other modifications can be effected within the spirit and scope of this invention.

I claim:

1. A soil fertilization method comprising the steps of:
   providing a source of ammonia-laden air;
   providing fresh filter media containing phosphoric acid soaked wood particles;
   passing the ammonia-laden gas through the fresh filter media to remove ammonia from the vapor and to convert the phosphoric acid soaked wood particles to ammonium phosphate coated wood particles;
   collecting the filter media containing ammonium phosphate coated wood particles now referred to as spent filter media; and
   applying the spent filter media to soil to fertilize the soil.

2. A method as claimed in claim 1 further comprising a step of providing a container for containing the filter media wherein the container has an inlet for receiving ammonia-laden vapor and an outlet for discharging ammonia-less vapor, the container also having access means for gaining access to the interior of the container to enable spent filter media to be removed from the container and to enable the container to be refilled with fresh filter media.

3. A method as claimed in claim 2 wherein the access means includes a lid removably attached to one end of the container.

4. A method as claimed in claim 4 wherein the phosphoric acid soaked wood particles includes wood chips.

5. A method as claimed in claim 4 wherein the wood chips have a particle size ranging between about 1/16" and 3/16" so that the said wood chips pass through screen having a mesh size of about ¼".

6. A method as claimed in claim 4 wherein said wood chips comprise about 50 wt % ⅛" wood chips, 20 wt % 1/16" wood chips, and 30 wt % 3/16" wood chips.

7. A method as claimed in claim 2 wherein the container is cylindrically shaped with the-inlet located on one end of the container and the outlet located on the other end of the container.

8. A method as claimed in claim 2 wherein at least one of the inlets and outlets is covered with a sheet of glass fibrous material for spreading the incoming ammonia-laden vapor across a lateral surface of the filter media contained within the filter container.

9. A method as claimed in claim 1 wherein the ammonia-laden vapor is produced by a diazo type copier.

10. A method as claimed in claim 1 wherein the filter media is contained within a cylindrically shaped plastic container having an integral bottom located at one end of the container and a removable lid located at the other end of the container, the integral bottom of the container and the removable lid being provided with a plurality of apertures for receiving ammonia-laden vapor and for passing ammonia-less vapor, the container also being provided with a pair of fibrous glass discs, one of which is located against the inner surface of the integral bottom of the container and the other of which is located against the inner surface of the removable lid of the container, said fibrous glass discs serving to pass ammonia-laden vapor and ammonia-free vapor, and to retain the filter media within the container so theft it is incapable of passing through the apertures of the container's integral bottom and removable lid.

* * * * *